United States Patent [19]

Dunlop et al.

[11] 4,318,999

[45] Mar. 9, 1982

[54] LOW FIRE HAZARD RIGID URETHANE INSULATION FOAM, POLYOL MIXTURES USED IN THE MANUFACTURE THEREOF, AND METHOD FOR MANUFACTURE THEREOF

[75] Inventors: William R. Dunlop, Rolling Meadows; William J. Pentz, Cary, both of Ill.

[73] Assignee: The Quaker Oats Company, Chicago, Ill.

[21] Appl. No.: 206,419

[22] Filed: Nov. 13, 1980

[51] Int. Cl.$^3$ .................... C08G 18/14; C08G 18/18; C08G 18/32
[52] U.S. Cl. .................... 521/171; 521/174; 521/176; 252/182
[58] Field of Search ............ 521/174, 171, 176; 252/182

[56] References Cited

U.S. PATENT DOCUMENTS

| | | | |
|---|---|---|---|
| 3,055,849 | 9/1962 | Hindersinn et al. | 521/176 |
| 3,676,376 | 7/1972 | Svoboda et al. | 521/176 |
| 4,029,611 | 6/1977 | Cenker et al. | 521/902 |

OTHER PUBLICATIONS

Technical Bulletin 186, FaRez B-260, Quaker Oats Co., Chicago, IL 60654, 6 pages, Oct. 1978.

*Primary Examiner*—H. S. Cockeram
*Attorney, Agent, or Firm*—Joseph P. O'Halloran

[57] ABSTRACT

A low fire hazard rigid urethane insulation foam having high compressive strength and low friability is disclosed. Rigid foam products of this invention have a Class I flame hazard rating according to the ASTM E-84 Steiner tunnel test. The urethane foam contains a halogenated base polyol and a modifying amount of a 2,5-bis-(hydroxymethyl) furan component.

4 Claims, No Drawings

LOW FIRE HAZARD RIGID URETHANE INSULATION FOAM, POLYOL MIXTURES USED IN THE MANUFACTURE THEREOF, AND METHOD FOR MANUFACTURE THEREOF

BACKGROUND OF THE INVENTION

Rigid polyurethanes are generally prepared by the reaction of a polyfunctional hydroxy compound, preferably one with a functionality of 3 or greater, with a polyfunctional isocyanate, preferably one having a functionality of 2.5 or more. In the manufacture of such rigid polyurethane foams, the polyfunctional isocyanate is typically admixed with a liquid stream comprising a polyhydroxy material, a blowing agent, a surfactant for stabilizing cell-size, and a catalyst. The rigid foam can be produced by either a "one-shot" method or by employing a semi-prepolymer or a prepolymer method. In the so-called "one-shot" method, a first stream of reactant containing isocyanate and/or polyisocyanate is admixed with a second stream comprising a polyol, a surfactant, and a blowing agent. Generally the second stream also contains a catalyst. Typically, in the manufacture of urethane board insulating stock, the resulting admixture is discharged into a moving conveyor provided with physical restraint elements, and the chemical reaction immediately commences, generating an exotherm, and the exotherm causes the vaporization of the volatile blowing agent if one is used. It is crucial, in the manufacture of insulating board stock to balance the reactivity and quantity of the respective components so that the exotherm, although great enough to cause the vaporization of the blowing agent, is not great enough to cause the disintegration of the cellular character of the resulting foam. Also, as the molecular weight builds, the viscosity of the reactant mixture increases, and this factor plus the presence of a surfactant e.g. cell wall stabilizer, assists in maintaining the closed cell structure of the resulting foam.

The fire retardant or, "low fire hazard" properties of furan ring-containing materials is well known due to the self-extinguishing property of the char which forms when furan-containing materials are burned. The disclosure in U.S. Pat. No. 4,029,611 issued to Cenker et al. shows a rigid cellular foam having carbodiimide and isocyanurate linkages prepared by catalytically condensing an organic polyisocyanate in the presence of a carbodiimide-promoting catalyst, a trimerization catalyst, and a polyfurfuryl alcohol polymer. The resulting isocyanurate foam has improved flame retardancy. The polyfurfuryl alcohol polymer employed includes the condensation products of furfuryl alcohol with formaldehyde, furfural, urea or mixtures thereof, produced by reaction of an acid catalyst providing a pH of 1 to 4, preferably 1.5 to 3, at a temperature of 25° C. to 120° C.

Likewise, a U.S. Pat. No. 3,865,757 issued to Wade teaches "resinous foam" produced by reaction of a furan compound, an isocyanate compound, and a phosphorus-containing inorganic acid or complex thereof. The reaction mixture disclosed can also contain an alcohol, an amine, a surfactant, and/or a supplementary blowing agent.

In addition, other now conventional low flame hazard polyurethane foams achieving a rating of Class I flame hazard rating according to the ASBM E-84 Steiner tunnel test are also well known. One of these well known non-furan-containing rigid insulating foams are produced by typical "standard" methods and is described hereinafter in Test "A" in Example 1.

An object of this invention is to provide a rigid urethane foam exhibiting low flame hazard properties.

A further object of this invention is to provide a self-extinguishing furan-containing urethane foam.

A still further object of this invention is to provide a furan-containing rigid urethane insulating foam having a closed cell content greater than 80%.

Another object of this invention is to provide a stable furan-containing polyol mixture composition for producing a rigid urethane foam, such mixtures having a Freon compatibility greater than 30 parts Freon to 100 parts of furan-containing polyol mixture.

Yet another object of this invention is to provide a rigid urethane foam having a compressive strength greater than 30 psi and a friability of less than 20%, which characteristics substantially exceed the performance that is believed to be achieved in the manufacture of present-day industry "standard" foams.

SUMMARY OF THE INVENTION

These and other objects in accordance with this invention, which objects will be apparent hereinafter, are achieved in compositions and methods, in accordance with this invention, in which a 2,5-bis-(hydroxymethyl) furan-containing polyol component is employed in conjunction with a base polyol component selected from the group halogenated polyols, in otherwise conventional rigid foam manufacturing technology.

A preferred novel hydroxyl composition for use in manufacture of rigid urethane insulating foams, in accordance with the present invention, comprise 12-24% 2,5-bis-(hydroxymethyl) furan component, 76-88% halogenated polyol base polyhydroxyl component, as well as 25-40 phr. (parts per hundred polyol components) blowing agent, 0.8-1.0 phr. catalyst, 1.5-2 phr. surfactant, and 2-7 phr. of an acid scavenger, such as, for example, an epoxy compound. (Ciba-Geigy CY 179 is eminently satisfactory as an acid scavenger. The latter acid scavenger is 3,4 epoxycyclohexylmethyl-3,4 epoxycyclohexane carboxylate.) This composition is stable for shipment, and can be used as the polyhydroxyl stream in a so-called "one-shot" method, in conjunction with a second, isocyanate stream, to produce rigid insulating foams in accordance with this invention.

By use of the term "bis-hydroxymethyl furan component" we intend to include compositions which are substantially pure monomeric "2,5-bis-(hydroxymethyl) furan," as well as mixtures of bis-hydroxymethyl furan with polymeric components formed by the acid polymerization of bis-hydroxymethyl furan. A preferred bis-hydroxymethyl furan component in accordance with the present invention is a mixture of 20-40% monomeric 2,5-bis-(hydroxymethyl) furan and 60-80% polymeric 2,5-bis-(hydroxymethyl) furan. Pure bis-hydroxymethyl furan tends to crystallize upon standing, whereas the preferred mixtures of monomeric and polymeric bis-hydroxymethyl furan are storage stable, with respect to crystallization.

An example of a commercially available mixture of this type is the material available under the trademark FA-REZ B-260 (T.M. The Quaker Oats Company). This commercially available product is reported to have a viscosity in the range of 10,000 cps.+2,000, has a hydroxyl content of 16-18%, a water content of 0.5 to 1.0% furfuryl alcohol content of up to 3% and is reportedly 85% polyhydroxymethyl functionality.

Generally speaking, the polyhydroxymethyl furan mixtures useful in accordance with the present invention preferably have a viscosity in the range of 6,000–12,000 cps. at 25° C., contains 35% to 45%, inclusive, monomeric bis-hydroxymethyl furan, less than 3% furfuryl alcohol monomer, less than 1.2% water and have an acid number of less than or equal to 3.5.

Such a hydroxymethyl furan diol mixture which is useful as an ingredient in accordance with the present invention, can be produced in a number of ways. For example, it can be produced by low acidic (i.e. pH above 4) polymerization of 2,5-bis-(hydroxymethyl) furan, as well as by the hydroxymethylation of furfuryl alcohol with formaldehyde using a weak acid such as, for example, acetic acid, propionic acid, or formic acid, under conditions which provide a pH above 4. Generally speaking, such products can be produced by hydroxymethylation of a furan ring-containing compound selected from the group furan and furfuryl alcohol, wherein said furan compound is contacted with formaldehyde in the presence of a catalytical amount of a weak acid catalyst having a pKa value at 25° C. between 3.0 and 5.0 inclusive, under conditions which provide a reaction mixture having a room temperature acidity pH greater than or equal to 4.0, said contacting taking place between 50° C. and 160° C. inclusive.

The "base polyol" which is used in the polyol mixture in accordance with the present invention is any of the commercially available conventional poly-halogenated polyols.

These halogenated polyfunctional polyols, generally speaking are reaction products between hydroxyl terminated material, and halogenated alkaline oxide compounds. For example, the commercially available and eminently satisfactory base polyol for use in accordance with the present invention which is commercially available under the trademark "Thermolin R.F. 230" (T.M. Olin Chemicals) is reportedly the reaction product between trichlorobutylene oxide and a suitable hydroxy terminated material such as, for example, ethylene glycol, glycerol, pentaerythritol, or sucrose, for example, to the desired hydroxyl number.

By "base polyol" we mean that portion of the polyol mixture which constitutes more than half of the polyol mixture, by weight. It should be noted that some of the base polyol can be substituted by addition of other polyols compatible with the present system, although the basic requirement that the "base polyol" constitute more than 50% of the polyol mixture would still be required. We prefer that the base polyol which is used in accordance with the present invention have a functionality greater than 3, but base polyols having functionality of less than 3 can be used. When polyols having a functionality of less than 3 are used as the base polyol, however, it is desirable to select as the polyisocyanate those compounds or components having relatively higher functionality, in accordance with practices well known in the rigid foam-producing art.

Thus the polyol compositions which are used in accordance with the present invention comprise 12–35% of bis-hydroxymethyl furan component, and 65–88% of the halogenated polyol. We have discovered that in mixtures containing more than 24% bis-hydroxymethyl furan component, inadequate compatibility with Freon blowing agents is observed with respect to long term storage conditions. Nonetheless mixtures including the bis-hydroxymethyl furan in an amount in the 24–35% range are useful in "day mix" operations.

The polyisocyanate used in accordance with the practice of the present invention must have a viscosity greater than 250 cps. at 25° C. and a functionality of greater than 2, i.e. 2.1 or greater. The polyisocyanate can be provided by the addition of "pure" polyisocyanate, or by the addition of "prepolymers" as ingredients. Polyisocyanate compositions having viscosities substantially less than 250 cps. at 25° C. do not provide sufficient compatibility with the bis-hydroxymethyl furan component used in accordance with the present invention.

A preferred polyisocyanate is PAPI 20, (T.M. Upjohn), a compound reportedly characterized as polymethylene base polyphenylisocyanate, a well known conventional polyisocyanate compound. Another eminently satisfactory polyisocyanate, having approximately the same composition, is commercially available under the trademark "Mondur" MR-200" (T.M. Mobay).

With respect to the blowing agent which is used in accordance with the present invention, it is preferred that a fluoro-chloro alkane blowing agent be used, although other conventional blowing agents such as, for example, water, can be used for desired. The fluorochloro alkane blowing agents provide low "K" factor foams, and are preferable for insulating stock to those blowing agents which produce, for example, $CO_2$ as the cell gas for insulation applications. The preferred blowing agent for use in accordance with the present invention, is mono-fluoro tri-chloro methane, for example, which is commercially available under the trademark "Freon 11B" (T.M. DuPont). The blowing agents which are used can be any conventional blowing agents, and the selection of a specific blowing agent or a combination of agents for use in accordance with this invention is entirely within the scope of the skill of a person with ordinary skill in the art, and does not constitute for the present invention.

Likewise, the selection of the specific cell wall stability component, the surfactant, is also within the skill of those working in the urethane foam art. We regard the preferred surfactant to be Dow Corning's "Q2 5103" polyalkyl siloxane-polyoxyalkaline copolymer.

Nonetheless other commercially available and well known surfactants can be used in accordance with the present invention, and the selection of the particular surfactant does not constitute part of the novel aspects of the present invention.

By the same token, the catalysts which were used in accordance with the practice of the present invention are conventional urethane-specific catalysts such as, for example, "Polycat 8" (T.M. Abbott Laboratories), a dimethylcyclohexyl-methyl amine. These and other amine catalysts which are well known and widely used in the manufacture of rigid polyurethane foams, are all eminently satisfactory for use in accordance with the compositions and methods of the present invention.

In the following Examples all percents are in percent by weight based on the overall mixture, all temperatures are expressed as degrees centigrade, and all parts are in parts by weight, unless otherwise expressed.

EXAMPLE I

A series of six tests was performed, and the respective ingredients used, the reactivities observed, the properties and results of the fire hazard testing of the respective products therefrom, are all reported in Table I. In each of these tests, all the components except for the respective polyisocyanate ingredient (the "Papi" ingredients) were first mixed together in a first stream in the proportions set forth in Table I, and were then admixed with the second stream consisting of the Papi component in the amount and type as set forth in Table I as well for each respective test. A conventional metering, mixing machine, was used, specifically, a 100 pound per minute Martin-Sweets machine. The resulting mixture was cast into wood molds, 4 inches deep, lined with "butcher" paper. To each mold, five and one half pounds of the reaction mixture was dispersed as a thin film on the respective molds. The reaction mixture, and the wooden molds were at ambient room temperature, i.e. between 65° and 75° F. After the mixture was poured into the molds, the molds were closed, and after 15 minutes the samples were pulled out of the molds. A rigid foam having a two pound per cubic foot density was produced in each instance. The components listed refer to: FA Rez B-260 (T.M. The Quaker Oats Company) is 2,5-bis-(hydroxymethyl) furan mixture comprising 35% monomeric bis-hydroxymethyl furan, and 61% polymeric bis-hydroxymethyl furan, and 4% of contaminants including furfuryl alcohol (about 1.5%), water and formaldehyde.

Thermolin RF-230 (T.M. Olin Chemicals) is a commercially available chlorinated polyol flame retardant polyhydroxyl composition which is well known and widely used in the art. "Poly-G 30-56" is a trademark of Olin Chemical and is characterized as trimethylolpropane propoxylate. The Dow Corning Q2-5103 surfactant was described above, as was Freon 11B, and Polycat 8. The Papi polyisocyanates are also well known commercially available polyisocyanates, the most significant difference between them being the viscosity. The viscosities of Papi 20, 135 and 580 are reportedly 2,150, 250, and 700, respectively cps. at 25° C.

Under reactivities, "Cream," "Firm," "Rise," "Tackfree Time," and "Exotherm (max.)," are terms which are standard in the art, and need no further description here. Likewise the items listed under "Properties" are also standard terms in the art requiring no further description. The Monsanto 2 ft. tunnel test is the well known test previously published by Monsanto Chemical, the NBS, $D_s$, refers to the National Bureau of Standards smoke development test, the U.S.B.M. refers to the well known U.S. Bureau of Mines flame penetration test. E-84 refers to the Underwriters Laboratories "Steiner" tunnel test which is also the well known test which needs no further description here.

TABLE I

| | A | B | C | D | E | F |
|---|---|---|---|---|---|---|
| Components (Indicated by Trademark) | | | | | | |
| FA Rez B-260, g | — | 100.0 | 93.5 | 15.7 | 24.0 | 31.7 |
| Furfuryl Alcohol, g | — | — | 6.5 | — | — | — |
| Thermolin RF-230, g | 84.3 | — | — | 84.3 | 76.0 | 68.3 |
| Poly-G 30-56, g | 15.7 | — | — | — | — | — |
| Dow Corning Q2-5103 surfactant, g | 1.6 | 1.5 | 1.7 | 1.57 | 2.0 | 1.27 |
| Freon 11B, g | 24.7 | 25.0 | 32.0 | 28.0 | 34.2 | 25.0 |
| Polycat 8, g | 0.94 | 0.80 | 0.8 | 0.94 | 1.0 | 1.08 |
| Papi 20, g | — | 161.5 | 137.1 | — | 122.6 | 127.7 |
| Papi 135, g | 81.96 | — | — | 107.7 | — | — |
| Papi 580, g | — | — | — | — | — | — |
| Reactivity | | | | | | |
| Cream, sec. | 18 | 46 | 27 | 15 | 22 | 25 |
| Firm, sec. | 105 | 70 | 65 | 70 | 100 | 45 |

TABLE I-continued

| | A | B | C | D | E | F |
|---|---|---|---|---|---|---|
| Rise, sec. | 115 | 80 | 65 | 90 | 120 | 70 |
| Tackfree Time, sec. | 125 | 80 | 85 | 75 | 100 | 55 |
| Exotherm (max.), °C. | 98 | 153 | 160 | 88 | 108 | 120 |
| Properties | | | | | | |
| Compressive Strength-Parallel, psi | 22 | 37.5 | 26 | 26.4 | 34.5 | 34.5 |
| Friability (10 min.), pct. | 44 | 1 | 4.5 | 17.6 | 4.7 | 6.3 |
| Closed Cell Content, pct. | 83 | 20 | 15 | 81 | 88 | 86 |
| Fire Hazard Testing* | | | | | | |
| Monsanto 2 ft. Tunnel, in. | 16.3 | 14 | 13.2 | 15.3 | 14.3 | — |
| NBS, $D_s$ | 73 | 24 | 22 | — | — | — |
| USBM, sec./pcf. | 254 | 776 | — | 653 | 982 | 810 |
| E-84 Flame | 20 | — | 36 | 15.4 | 15.0 | — |
| Smoke | 87 | — | 323 | 67 | 41 | — |

Note:
D, E, F, are in accordance with this invention.

The tests reported are identified as tests A through F. Tests A, B, and C are not in accordance with the present invention, whereas Tests D, E, and F are in accordance with the present invention. Test A sets forth the practice which may be regarded as a "standard" in the art. It is noted that the polyol consists of 84.3% Thermolin (the base polyol), and 15.7% of a supplemental plasticizing polyol. It is apparent from a consideration of the properties and fire testing data that the resulting product exhibits useful compressive strengths, a high degree of friability, and a satisfactory closed cell content. The fire hazard testing data indicates that the resulting foam is a Class I fire hazard rated material.

Tests identified as Test B and C constitutes "controls," which are provided for the purpose of comparison only, and also are not in accordance with the present invention, utilize either substantially all polyhydroxymethyl furan or a mixture of polyhydroxymethyl furan with furfuryl alcohol as the sole polyol ingredient. From the data it is seen that the compressive strengths are very high in the case of Test B, and are improved in Test C over the test results obtained in Test A, but that in both instances the friability is vastly improved. Nonetheless, neither the product of Test B or C is useful as an insulation material because of the closed cell content is relatively low, e.g. 20% of B and 15% in C. Thus complete fire test data was not obtained in either of these since neither were regarded as useful as insulating rigid foams. Nevertheless it is apparent that the U.S. Bureau of Mines test results for Test B was outstanding compared to that in the "standard" of the industry represented by Test A.

Tests D, E, and F are in accordance with the present invention. It is noted that Test D, E and F each uses a successively greater portion of the bis-hydroxymethyl furan component, in accordance with the present invention. Consequently these tests used successively less of the standard polyhalogenated polyol, as base polyol. It is apparent from the data that, compared to the results obtained in Test A, for example, that the compressive strengths is improved in accordance with the present invention, the friability is vastly improved and that the closed cell content is entirely satisfactory. In addition the fire hazard testing data indicates that the samples obtained by the method of Test D and E are Class I flame hazard rated foams. It should be noted that the viscosity of the polyol mixtures utilized in Test F was extremely high (estimated to be about 3,000). Inasmuch as the same identical equipment was used in each of these tests, the equipment being set to accommodate a polyol having a viscosity in the neighborhood of less than 2,000 cps. at 25° C., the settings employed were not optimum for Test F. Consequently, it is believed that inadequate mixing was encountered and that in order to be meaningful, tests, including fire hazard testing, should be done only on a thoroughly, homogeneously mixed material free of the color striations which were observed in the product of Test F, which color striations are believed to indicate poor, i.e. inadequate mixing prior to foam formation.

EXAMPLE II

The purpose of this test is to compare the dimensional stability under flame heating stress between a product produced in accordance with the present invention and a commercially available glass reinforced isocyanurate foam and a "standard" urethane foam. The results are set forth in Table II. The commercially available isocyanurate foam is one commercially available for roof decking, and this sample was glass fiber reinforced. In this test a 6"×6"×1" foam sample is supported on a ring stand and heated from below by a Meeker burner (1900°–2000° F. flame) in which the flame tip is approximately 1.33" below the sample, and the percentage shrinkage of the various dimensions are measured after 15 minutes of the test. The foams to which the commercially available rigid foam sample is compared were unreinforced urethane foams produced in accordance with Test A and Test D as reported in Table I. Thus "Test A" is the "standard" urethane foam not in accordance with the present invention, and Test D column data sets forth data from material which is made in accordance with the present invention in the procedure of Test D in Example 1, herein.

TABLE II

| HEAT STABILITY SCREENING TEST | | | |
|---|---|---|---|
| | J.W. Glass Reinforced Isocyanurate | Urethane Test A | Test D* |
| Shrinkage | | | |
| Width | 1.9 | 20.9 | 2.8 |
| Length | 1.9 | 19.9 | 1.5 |
| Thickness | 12.9 | 27.7 | 24.7 |

*In accordance with this invention

Thus it is manifest from a consideration of the data of Table II that the product produced in accordance with the present invention exhibited heat stability characteristics vastly superior to the characteristics observed in connection with products produced in accordance with "standard" methods, and in fact, the unreinforced product of the present invention compared quite favorably to the characteristics observed in connection with a commercially available glass reinforced isocyanurate roof decking material.

We claim:

1. In a method for manufacturing rigid polyurethane foam, which method includes co-reacting a polyhydroxy composition with an organic polyisocyanate composition, in the presence of a blowing agent, a foam cell stabilizer, and a catalyst consisting of an urethane-specific catalyst, and in which the polyhydroxy composition includes a base portion thereof consisting essentially of halogenated polyhydroxyl compounds, the improvement comprising:
   adding to the polyhydroxyl composition a 2,5-bis-(hydroxymethyl) furan component in an amount sufficient to provide between approximately 12 and 35 weight percent of the polyhydroxyl composition.

2. The method of claim 1 wherein the 2,5-bis-(hydroxymethyl) furan component is a mixture of 20 to 40 percent, inclusive, of monomeric 2,5-bis-(hydroxymethyl) furan and 60 to 80 percent, inclusive, of polymeric 2,5-bis-(hydroxymethyl) furan.

3. A stable, liquid polyhydroxyl composition for use in the manufacture of rigid urethane insulating foams, comprising 12–24 percent 2,5-bis-(hydroxymethyl) furan component, 76–88 percent halogenated polyol base polyhydroxyl component, as well as 25–40 PHR (parts per hundred polyol compounds) of blowing agent, 1.5–2 PHR surfactant, and 2–7 PHR of an acid scavenger, and a catalyst consisting of 0.8–1.0 PHR urethane specific catalyst.

4. The composition of claim 3 wherein the 2,5-bis-(hydroxymethyl) furan component is a mixture of 20 to 40 percent, inclusive, of monomeric 2,5-bis-(hydroxymethyl) furan and 60 to 80 percent, inclusive, of polymeric 2,5-bis-(hydroxymethyl) furan.

* * * * *